Aug. 13, 1957 A. C. RAMSEY 2,802,686
EGG OPENING DEVICE
Filed April 7, 1955
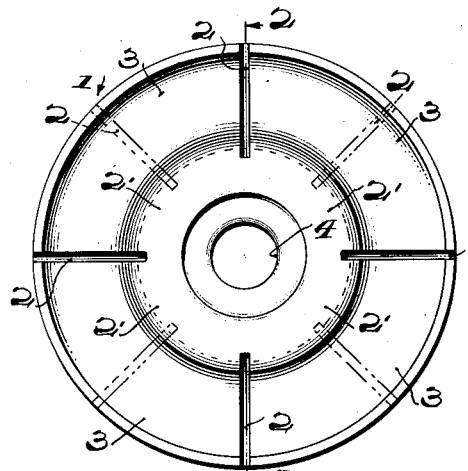
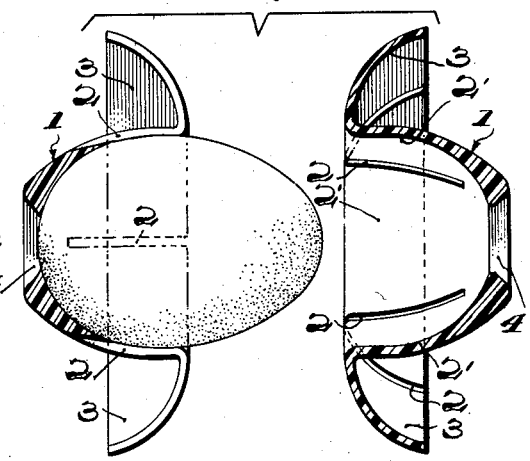
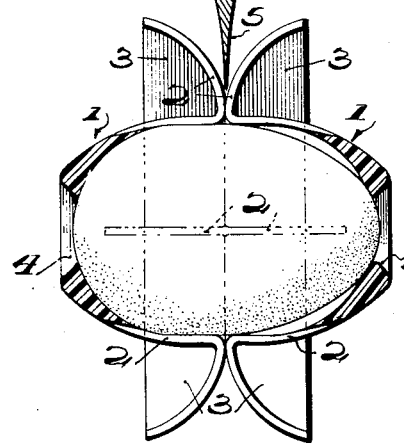
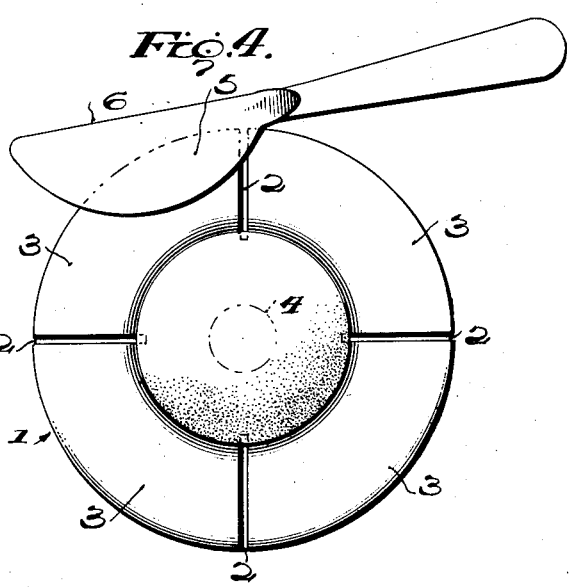
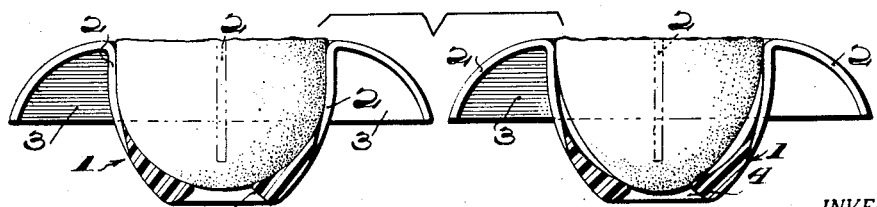
INVENTOR.
Arthur C. Ramsey
BY
W. J. Ecclestan
ATTORNEY.

United States Patent Office 2,802,686
Patented Aug. 13, 1957

2,802,686

EGG OPENING DEVICE

Arthur C. Ramsey, Miami, Fla.

Application April 7, 1955, Serial No. 500,049

4 Claims. (Cl. 294—1)

(Granted under Title 35, U. S. Code (1952), sec. 266)

The invention described herein, if patented, may be manufactured and used by or for the Government for governmental purposes, without the payment to me of any royalty thereon.

This invention relates to egg-opening devices and has for its primary object to generally facilitate the opening of soft boiled or soft-cooked eggs without burning the fingers and without loss of contents.

More specifically, it is an object of the invention to provide automatically adjustable elements to grasp the opposite ends of an egg so shaped and proportioned as to automatically swing the egg halves into upright positions after being severed.

It is another object of the invention to provide egg-grasping elements with means for directing a knife to the intermediate portion of an egg for the severing operation.

A still further object of the invention resides in the provision of means to facilitate the removal of the egg shell sections from the holders after their contents have been removed.

Other objects and advantages of the invention will be apparent from the following description when taken in connection with the accompanying drawings, in which, Fig. 1 is an end elevational view of the egg holder;

Fig. 2 is a sectional view taken on line 2—2 of Fig. 1, and showing the two cup-shaped members separated and about to be put together to hold the egg which is shown in elevation; the section of one cup member passing through the slots and the section on which the other cup member is taken being at one side of the slots;

Fig. 3 is a sectional view of the egg opening device showing the cup members in places about the egg and the knife about to descend to sever the egg;

Fig. 4 is a top plan view of one of the cup-shaped members and showing the knife in position for severing an egg held therein; and Fig. 5 is a sectional view of two cup-shaped members after the egg has been severed and the members rolled over into their stationary positions in which the contents of the egg shell halves are removed.

Referring to the drawings in greater detail, the numeral 1 indicates the two identical cup-shaped members which together form the holder for the cooked egg during the severing operation and have a combined depth approximately the length of an egg. A description of one of the members 1 will therefore suffice.

The cup-shaped members 1 are preferably formed of some conventional plastic which is unaffected by the heat encountered in the operation of holding and severing cooked eggs, but it will be understood that under some conditions it might be desirable to form the cup-shaped members of some base metal plated with silver or the like. Inasmuch as it is necessary to grip the body of the egg with some slight pressure and especially in view of the fact that eggs vary in size, the cup members are formed with a plurality of slots 2 to form expansible sections 2', there being four of such sections in the present illustration.

The rims of the cup-shaped members are formed with outwardly and downwardly directed flanges 3 and the slots 2, of course, are extended outwardly through the flanges 3 completely through the free ends thereof as clearly indicated in the several figures of the drawing. The flange 3 extends downwardly from the edge of the cup a distance equal to about one-half of the height of the cup so as to cause the proper positioning of the cup after the severing operation, as will later appear. The cup-shaped members 1 are preferably each formed with an opening 4 at the center of the bottom portion to permit the entrance of the finger of the operator to eject the shell halves after the contents have been removed.

In the operation of the novel egg opening device, the egg is grasped between two of the cup-shaped members 1 and is firmly held in the position indicated in Fig. 3 by reason of the resiliency provided by the slots 2. When it is so held and supported on a table, a knife 5 provided with a relatively thick back portion 6 is passed downwardly between the members 1 into contact with the egg, being directed to the midportion thereof by the curved flanges 3. After the egg halves have been entirely severed, the cup members are fully separated and by reason of the location of the flanges 3 and the slight pressure provided by the wider portion of the knife 6, the cup members will automatically roll or rock over into the upstanding positions shown in Fig. 5 in which the contents of the egg are exposed for removal either for eating directly from the shell or for removal into another container. The empty shells may then be removed by merely extending the end of the finger up through the opening 4 in the bottom of the cup member thereby ejecting the shells.

From the foregoing description and the attached drawings, it will be readily apparent that I have devised an egg opening device in which a soft cooked or soft boiled egg may be grasped and severed without the fingers of the operator ever coming into contact with the hot shell, and the sections of the eggs are automatically swung into upright positions without spilling the contents so that the contents may be removed for final disposition.

In accordance with the patent statutes, I have described what I now consider to be a preferred form of the invention, but inasmuch as minor structural changes may be made without departing from the spirit of the invention, it is intended that all such changes be included within the scope of the appended claims.

I claim:

1. An egg-opening device comprising a pair of substantially rigid cup-shaped members having a combined depth approximating the length of an egg, an outwardly and downwardly extending continuous flange projecting from the rim of each member and extending to a point short of the bottom of the member.

2. An egg-opening device comprising a pair of substantially rigid cup-shaped members having a combined depth approximating the length of an egg, an outwardly and downwardly extending continuous flange projecting from the rim of each member and extending to a point short of the bottom of the member, the bottom of each member provided with a finger-receiving opening.

3. An egg-opening device comprising a pair of substantially rigid cup-shaped members having a combined depth approximating the length of an egg, an outwardly and downwardly extending flange projecting from the rim of each member and extending to a point shoft or the bottom of the member, the side wall and flange of each member provided with at least one slit extending axially thereof, whereby the member may expand and contract circumferentially.

4. An egg-opening device comprising a pair of substantially rigid cup-shaped members having a combined depth approximating the length of an egg, an outwardly and downwardly extending flange projecting from the rim of each member and extending to a point short of the bottom of the member, the side wall and flange of each member provided with at least one slit extending axially thereof, whereby the member may expand and contract circumferentially and the bottom of each member provided with a finger-receiving opening.

References Cited in the file of this patent

UNITED STATES PATENTS

| | | |
|---|---|---|
| 944,827 | Sheldon | Dec. 28, 1909 |
| 1,759,398 | Hart | May 20, 1930 |
| 2,283,390 | Seldomridge | May 19, 1942 |
| 2,531,955 | Toney | Nov. 28, 1950 |
| 2,548,667 | Gruss | Apr. 10, 1951 |